US008170306B2

(12) United States Patent
Yu et al.

(10) Patent No.: US 8,170,306 B2
(45) Date of Patent: May 1, 2012

(54) AUTOMATIC PARTITIONING AND RECOGNITION OF HUMAN BODY REGIONS FROM AN ARBITRARY SCAN COVERAGE IMAGE

(75) Inventors: Daphne Yu, Yardley, PA (US); Marcel Piotraschke, Nuembrecht (DE); Ludovic Sibille, Rosny-sur-Seine (FR)

(73) Assignee: Siemens Aktiengesellschaft, München (DE)

( * ) Notice: Subject to any disclaimer, the term of this patent is extended or adjusted under 35 U.S.C. 154(b) by 1044 days.

(21) Appl. No.: 12/107,301

(22) Filed: Apr. 22, 2008

(65) Prior Publication Data

US 2008/0267471 A1    Oct. 30, 2008

Related U.S. Application Data

(60) Provisional application No. 60/913,842, filed on Apr. 25, 2007, provisional application No. 60/944,210, filed on Jun. 15, 2007, provisional application No. 61/030,319, filed on Feb. 21, 2008.

(51) Int. Cl.
*G06K 9/00* (2006.01)
(52) U.S. Cl. .................................................. 382/128
(58) Field of Classification Search .................. None
See application file for complete search history.

(56) References Cited

U.S. PATENT DOCUMENTS
2008/0058613 A1 * 3/2008 Lang et al. ................... 600/300

OTHER PUBLICATIONS

G. Christensen and H, Johnson. *Consistent image registration* 2001.
T. Rohlfing, R. Brandt, R. Menzel uud C. Maurer. *Segmentation of threedimensional images using non-rigid registration: Methods and calidation with application to confocal miscroscopy images of bee brains* 2003.
Radu Stefanescu, Olivier Commowick, Gregoire Malandain, Pierre-I'ves Boundian, Nicholas Ayache and Xavier Pennee. *Non-Rigid, Atlas to Subject Registration with Pathologies for Conformal Brain Radiotherapy* 2004.
H. Fiijita R. Yokoyama T. Kiryu M. Kanematsu X. Zhon, T. Hara and H. Hoshi. *Preliminary Study for Automated Recognition of Anatomical Structure from Torso CT images.* In Proceedings of the 2005 IEEE. Engineering in Medicine and Biology 27th Annual Conference 2005.

(Continued)

*Primary Examiner* — Roberto Velez
(74) *Attorney, Agent, or Firm* — Donald B. Paschburg

(57) ABSTRACT

A recognition pipeline automatically partitions a 3D image of the human body into regions of interest (head, rib cage, pelvis, and legs) and correctly labels each region. The 3D image is projected onto a 2D image using volume rendering. The 3D image may contain the whole body region or any subset. In a learning phase, training datasets are manually partitioned and labeled, and a training database is computed. In a recognition phase, images are partitioned and labeled based on the knowledge from the training database. The recognition phase is computationally efficient and may operate under 2 seconds in current conventional computer systems. The recognition is robust to image variations, and does not require the user to provide any knowledge about the contained regions of interest within the image.

9 Claims, 5 Drawing Sheets

OTHER PUBLICATIONS

Xiaugroug Zhou, Shigeaki Kobayashi, Tatsuro Hayashi, N. Murata Takeshi Hara, Hiroshi Fujita, Ryujiro Yokoyama, Takuko Kiryn, Hiroaki Hoshi and Machiko Sato. *Lung structure recognition—a further study of thoracic organ recognitions based on CT Images*. In Heinz U. Lemke, Michael W. Vatmier, Kionari Inamura, Allan G. Farman, K_Doi and Johan H. C. Reiber, Editoren. CARS Band 1256 von *International Congress Series* pp. 1005, 1030. Elsevier 2003.

Edgar Osuna, Robert Freund and Federico Girosi. *Support Vector Machines: Training and Applications*. Technical Report AIM-1602 1977.

M. Nilsson. *First Order Hidden Markov Model, theory and implementation issues* 2005.

Ergun Bicici and Deniz Yuret. *Locally Scaled Density Based Clustering*. In B. Beliczynski et al., Editoren, *ICANNGA 2007, Part I LNCS 4431* pp. 739 748 Berlin Heidelberg Apr. 2007. Springer-Verlag.

Javier R. Movellau. *Tutorial on Gabor Filters* 1996.

I. Fasel, M. Bartlett and J. Movellan. *A comparison of gabor filter methods for automatic detection of facial landmarks* 2002.

Yoav Freund and Robert E. Schapire. *Experiments with, a New Boosting Algorithm*. In *International Conference on Machine Learning* pp. 148 156 1996.

Zonbin Ghadramani and Michael I. Jordan. *Factorial Hidden Markov Models*. In David S. Touretzky, Michael C. Mozer and Michael E. Hasselmo. Editoren. *Proc. Conf. Advances in Neural Information Processing Systems*. NIPS Band 8 pp. 472 478. MIT Press 1995.

J. Bilmes. A Gentle Tutorial on the EM Algorithm and its Application to Parameter Estimation for Gaussian Mixture and Hidden Markov Models 1997.

Yuukou Horita, et al., "Region Segmentation Using K-Mean Clustering and Genetic Algorithms", Department of Electronics and Computer Science, Faculty of Engineering, Toyama University, Toyama, Japan, pp. 1016-1020, 1994 IEEE.

Martin Ester, et al., "A Density-Based Algorithm for Discovering Clusters in Large Spatial Databases with Noise", Institute for Computer Science, University of Munich, Germany 1996.

Jon Louis Bentley, "K-d Trees for Semidynamic Point Sets", AT&T Laboratories, Murray Hill, NJ, pp. 187-197, 1990.

Hong Shen et al., "Intelligent Data Splitting for Volume Data", *Medical Imaging 2006: Image Processing*, Proc of SPIE vol. 6144 61444F-1-61444F-7.

Ben Kröse, et al., "An Introduction to Neural Networks", Eighth edition, Nov. 1996, pp. 1-135.

\* cited by examiner

Observations | | States

Part : Ribs
Position : 0
Size : 164    $p(o1 \mid q1)$ →

$p(q2 \mid q1)$ ↓

Part : Neck
Position : 0.5
Size : 32    $p(o2 \mid q2)$ →

$p(q3 \mid q2)$ ↓

Part : Hips
Position : 0.6
Size : 158    $p(o3 \mid q3)$ →

AUTOMATIC PARTITIONING AND RECOGNITION OF HUMAN BODY REGIONS FROM AN ARBITRARY SCAN COVERAGE IMAGE

RELATED APPLICATIONS

The present patent document claims the benefit of the filing dates under 35 U.S.C. §119(e) of Provisional U.S. Patent Application Ser. Nos. 60/913,842, filed Apr. 25, 2007, 60/944,210, filed Jun. 15, 2007, and 61/030,319, filed Feb. 21, 2008, which are hereby incorporated by reference.

BACKGROUND

The present document relates to medical imaging. In particular, different portions of the image are identified to assist diagnosis.

Physicians are confronted with patients who may have multiple fractures or inner injuries all over their body, such as after a serious traffic accident. In such situations, the time needed to find the injuries and to classify the injuries by importance is a critical factor.

The ability to recognize salient regions of interest within a human body from medical images may provide many benefits. It can improve operator workflow and efficiency within a medical facility. The latest generation of CT scanners often produces data with sub millimeter resolution and a large amount of pixel data. Nevertheless, most of the time, radiologists are looking for a specific pathology and thus a specific part of the dataset. It would be very helpful to support the physician in finding injuries as fast as possible before surgery.

Specific regions of interest may be segmented. Atlas-based classifiers based on registration techniques may localize specific organs. Atlas-based classifiers create an input model by processing the input images and register the input model over an atlas (a mean shape that is already segmented and labeled). The registration produces a mapping from the input model space to the atlas space. To label the input, each point of the input model is found in the atlas to identify the label. The atlas-based classifier may work on a specific ROI and not on a general scan. In addition, the atlas-based classifier may be computationally intensive, may not be able to handle large-scale deformations, and may have mismatch problems with the target image. An atlas-based classifier may not be able to handle arbitrary image scans, since atlas-based classifiers use a specific region of interest (ROI) for reliable operation.

Other segmentation has been provided. Anatomical structures from torso CT images may be automatically extracted and classified. The original CT image is separated into air, bone, fat, muscle, and organ regions based on the difference of their density and spatial location. The torso region is then segmented using spatial information, such as bone and fat distribution. In another approach, the bone intensity profile is used to separate various sections of bone structures. These approaches may be limited in their application since the image scan is assumed to cover a particular body area. These approaches may not be robust for images with unknown or missing body areas.

BRIEF SUMMARY

By way of introduction, the preferred embodiments described below include methods, systems, computer readable media, processing pipelines, and instructions for partitioning or learning to partition body regions in a medical image of an arbitrary view of a body. The arbitrary view is partitioned using clustering, such as density clustering. Skeletal information in the view may be separated or isolated to assist in the partitioning. The partitioned regions are classified using local information, and then the classifications are checked using a model of arrangements of body parts.

In one aspect, a method is provided for partitioning body regions in a medical image of an arbitrary view of a body. A skeletal two-dimensional representation of a three-dimensional volume is partitioned. The partitioning is a function of density clustering. One or more region being a function of the partitioning are classified. Coherence of the classifying across the one or more regions is ensured.

In a second aspect, a system is provided for partitioning body regions in a medical image of an arbitrary view of a body. A medical imaging device is operable to acquire data representing a three-dimensional volume of a patient. A processor is operable to render a two-dimensional representation of the three-dimensional volume from the data, operable to cluster the two-dimensional representation into one or more clusters, and operable to classify each of the clusters as different regions of the patient. A display is operable to output image information as a function of the classification of the clusters.

In a third aspect, a computer readable storage medium has stored therein data representing instructions executable by a programmed processor for partitioning body regions in a medical image of an arbitrary view of a body. The storage medium includes instructions for receiving the medical image of the arbitrary view, identifying skeletal information from the medical image, density clustering the skeletal information into one or more clusters, classifying the first cluster as a first region of the body as a function of information local to the first cluster, classifying any additional cluster as other regions, different than the previous region, of the body as a function of information local to the currently processing cluster, and resolving discrepancies across the classifications of the found regions.

In a fourth aspect, a computer readable storage medium has stored therein data representing instructions executable by a programmed processor for learning to partition body regions in a medical image of an arbitrary view of a body and to recognize the body regions. The storage medium includes instructions for optimizing clustering parameters as a function of a genetic algorithm, training a classifier as a function of features derived as a function of the optimized clustering parameters, and learning a model for establishing coherence of outputs of the classifier.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
FIG. 1 shows example medical images.

A recognition processing pipeline automatically partitions and classifies body regions of interests, such as parts of the human or animal body. The pipeline uses a projected 2D image of a 3D scan image to partition by density or other clustering, local classification and/or application of a global coherence model. The pipeline may be highly robust to a large variation of input images in which the body region content of the images are unknown. The method may be applied to a wide range of applications.

Automatic processing may remove any undesired parts of a dataset. Using the partitions, fewer than all of the data may be transmitted, processed, and/or stored. The undesired parts of the data may not be transmitted between data storage components. In a medical visualization software application, only the salient regions of interest for a pathology may be presented in order to focus operator workflow. Localization of salient regions may also reduce the resource needs (computer memory and speed), and potentially also reduce the manual effort and time to manipulate the data for further diagnosis of diseases. For example, methods used for segmenting and subsequently measuring properties about a specific organ may require identification of a good proximity region for the organ. The recognition pipeline may be used to compute this proximity region as an initializer to these methods.

The recognition pipeline may be applied to various medical imaging situations or domains. For example, a data attribute quality assessment is performed. An incorrect data attribute may be provided as a label of the body region contained in an image scan, such as an abdomen label when the region contains legs and abdomen, no abdomen at all, or no attribute at all. The recognition pipeline may automatically detect such incorrect attributes and automatically correct the attribute.

As another example, visualization workflow may be improved. A 3D medical rendering may be created differently according to the type of region (e.g., render a head image differently than a chest image). The recognition pipeline may automatically partition and apply the preferred rendering presets (e.g., hanging protocols, layout, and transfer functions) based of the detected region of interest.

In another example, efficiency of medical image transmission may be improved. It may be desirable to transmit medical images containing only a particular region of interest to specific storage destinations within a hospital to improve efficiency. The recognition pipeline may be used to automatically partition and label the region of interest for such use.

As another example, improved segmentation and registration initialization are provide by segment localization. Typically, segmentation and registration methods are parameterized to optimally match a particular organ of interest within a human body. Such methods may use a reference image that will define the mean or typical shape. The presence of non-target regions may cause segmentation and registration methods to fail, or at least reduce their accuracy. The recognition pipeline may be used to remove the non-target regions from the target scan, or to better initialize the segmentation and registration method and improve accuracy.

Medical image processing is challenging since objects of interest may not have a clear boundary, objects vary widely from individual to individual, parts may be missing, the image data may be noisy, the imaged region may contain pathologies, there may be variations in contrast agents, and the imaged region may include medical instruments, such as tubing, pins, and stents. The input scan may be of any type and size with a various number of parts or incomplete parts. FIG. 1 shows six example input images rendered from computed tomography volume scans. The variation in these examples shows some of the challenges to automatic partitioning by a processor. The recognition pipeline may have to operate with unknowns.

The recognition pipeline may deal efficiently and accurately with scans that cover the whole body or a small subset of the whole body. Efficient computation may be provided. For example, a typical scan may be partitioned and classified in less than 2 seconds. The computation time may not be significantly impacted by the original 3D volume size, which can be large. The recognition pipeline operates mostly on one or more smaller 2D projected images. The recognition pipeline may be scan direction invariant. The recognition pipeline may be robust to noise (bad image reconstruction, artifacts, medical instruments, contrast agents).

Figure 2:
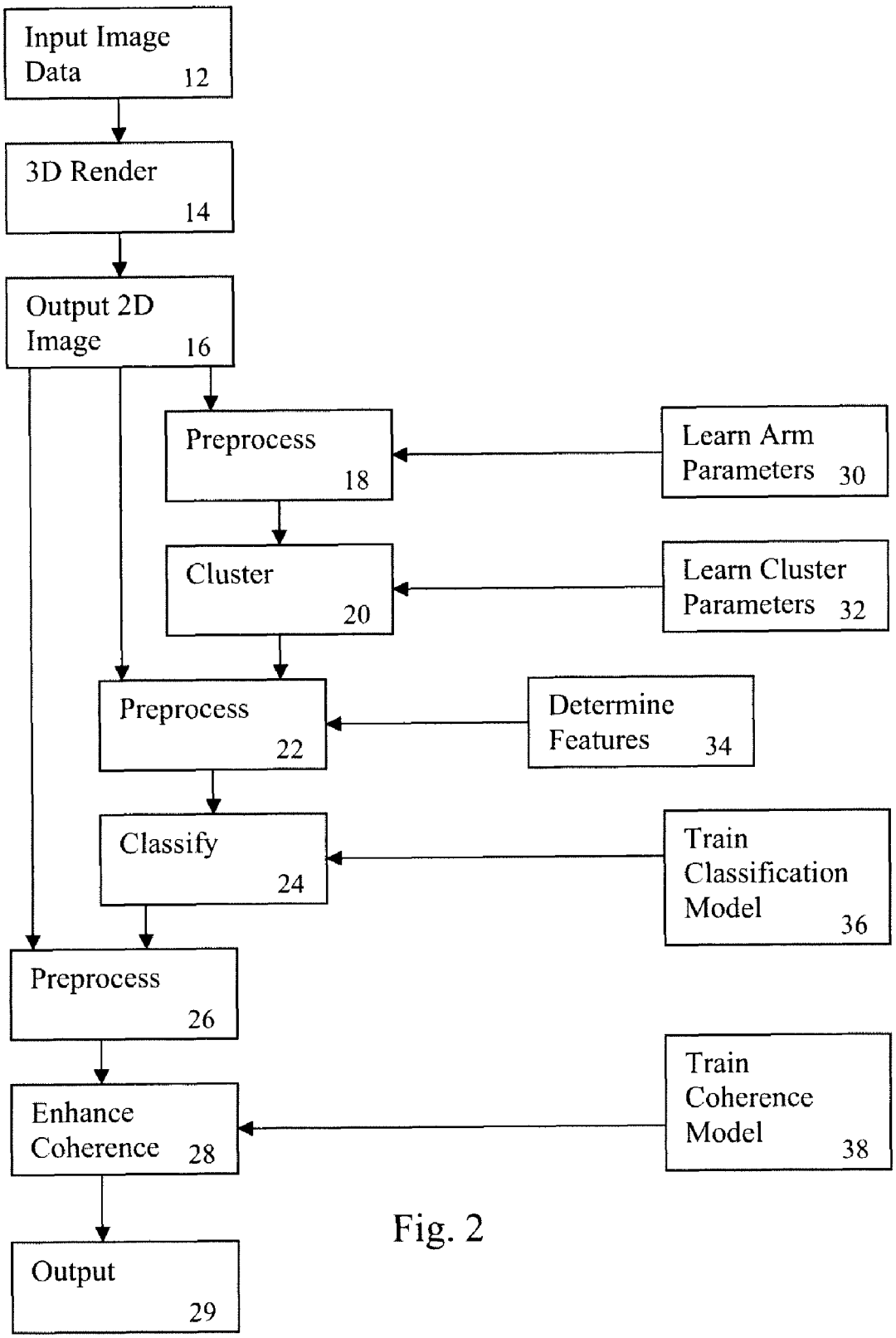
FIG. 2 is a flow chart diagram of a method for recognizing body regions in a medical image of an arbitrary view of a body.

FIG. 2 shows a method for recognition and learning to recognize body regions in a medical image of an arbitrary view of a body. The body is a human, animal, or other body. The method of FIG. 2 is implemented by the system shown in FIG. 8 or a different system. FIG. 2 represents two phases, a learning or off-line phase, and a recognition or runtime phase. In the learning phase, all of the acts or particular ones of the acts 30-38 are performed. The recognition pipeline is designed, tested, and/or created by performing the acts 12-29 as part of the learning and machine training performed in acts 30-38. In the recognition phase, the acts on the left (acts 12-29) are performed in a runtime operation. In the recognition phase, the acts may be separated generally into categories of image input acts 12-16, clustering or partitioning acts 18-20, recognition or classification acts 22-28, and an output act 29. Other separations may be provided. Additional, different, or fewer acts than shown may be provided, such as performing the acts 20, 24, and/or 28 without the preprocessing of acts 18, 22, and 26. As another example, act 12 is performed without acts 14-16. In other examples, one or more of the recognition phase categories are performed without one or more other ones of the categories. The acts are performed in the order shown or a different order.

In acts 12-16, a medical image of an arbitrary view is received. The view is established by the scan location, the type of imaging device, user settings, rendering view position, and/or other factors. The medical image is a computed tomography, magnetic resonance, positron emission, ultrasound, or other now know or later developed medical image.

The medical image is a three or two-dimensional image, such as an image representing a scan plane within a patient. The two-dimensional image may represent a projection. In one example, the projection is acquired due to the nature of the imaging device, such as an x-ray representing the irradiated volume integrated onto a two-dimensional detector or film. In another example provided in acts 12-16, data representing a three-dimensional volume is acquired and rendered into a two-dimensional representation as the image.

In act 12, data is received. The data is for a two-dimensional image or represents a three-dimensional volume. The data has any desired resolution, voxel density, or other characteristic. The data represents full three-dimensional grid sampling of the volume. Alternatively, the data represents a plurality of non-parallel planes through the volume and/or sparse sampling. The data may be in any format, such as Digital Imaging and Communications in Medicine (DICOM) images. DICOM images may include additional information, such as the scale of the image.

In act 14, the data representing the volume is rendered. The 3D volume data is loaded and rendered using volume rendering techniques now known or later developed. For example, maximum intensity projection rendering is used. Alpha blending or other rendering may be used. In one technique, data along each of a plurality of ray lines is combined to form each pixel. A different rendering may result, depending on the view orientation. The image is oriented and scaled using medical scan orientation information. No particular image orientation is needed. The orientation may be limited to orientations for which learning and/or training was provided.

The data used for rendering and/or the resulting image may be segmented. For example, the tissue density is encoded as image intensities in computed tomography. The skeleton may be automatically extracted using a fixed transfer function that renders only high-density regions. The skeleton image contains a lesser amount of variations amongst individuals than soft tissues. After volume rendering, the result is a projected medical image that contains information for the bones and any other high-density medical instruments such as the parts in the table, wires and stents. Alternatively, soft tissue information with or without skeleton information may be used.

In act 16, the two-dimensional image or two-dimensional representation of the volume is output. Instead of processing volume data, the 2D projections of the rendered 3D volume or 2D medical image are output. FIG. 1 shows different output image examples of a projection rendering of skeletal information for a coronal view. By operating on 2D representations, the resource needs to partition and recognize the regions of interest (ROI) may be reduced.

One or a plurality of medical images may be output in act 16. For example, the clustering of act 20 is performed on two or more skeletal two-dimensional representations. The two-dimensional representations are rendered from different views of the same three-dimensional volume. A given view or image shows two axes of the three axes volume. Using several views (e.g., several projection planes), such as saggital and coronal, more information may be utilized. The partitioning is performed on the combined information from the views and the enhancement of coherence act 28 uses the separate classifications to provide classifications based on the separate images. Alternatively, the clustering and/or classifying acts 20 and/or 24 use data from multiple images for outputting clusters and/or classifications. For the discussion below, the coronal view is considered. Only one view may be used. The two-dimensional image is output for partitioning.

In act 18, the output image is preprocessed. The preprocessing assists in the clustering of act 20. Any or no preprocessing may be performed. For example, skeletal information is identified from the medical image. The received image may only represent skeletal information. Skeletal identification may be skipped or performed to more likely assure identification of skeletal information.

The medical image is binarized. For example, the two-dimensional rendering is binarized to output a skeletal two-dimensional representation. The 2D projection is binarized by applying a threshold to the image intensity. For example, all pixels with normalized intensity (l) $0 \leq l < 0.5$ are set to 0 and $0.5 \leq l < 1$ are set to 1. Other binarization techniques may be used.

As another or additional example of preprocessing, arm information is identified and removed. Since the patient's arms may not be a region of interest, the arm information is removed if detected. Other or no regions may be removed from the skeletal two-dimensional representation.

Figure 3:
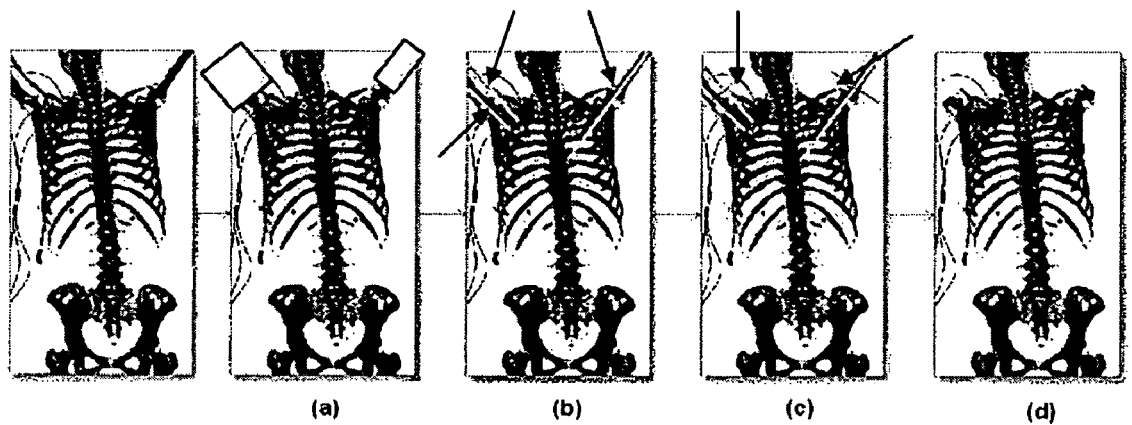
FIG. 3 shows a medical image with associated processing indications to remove arm information.

Arms tend to smooth the contour of the skeleton and consequently decrease the accuracy of the partitioning. The left most image of FIG. 3 shows an example two-dimensional medical image which includes arm information. To remove the arms, structures that look like a rectangle are found by analyzing the spreading function of candidate regions. If this rectangle satisfies some integrity constraints like the shape, size and density, then the identified structure is removed from the 2D binarized image, as represented by FIG. 3d.

FIGS. 3a-d represent one example embodiment for removing arm information. Seeds are placed at all points on the skeleton border of the 2D image. The seeds are recursively propagated to the neighbors until the size of the connected regions reaches the maximum allowable size for an arm. FIG. 3a shows boxes over the skeletal pixels representing the regions identified by recursive propagation.

Each seed has two coordinates. For each group of seeds, a covariance matrix, A, is computed. The Eigen value and Eigen vector decomposition of A are computed. Two positive Eigen values $\lambda_1$ and $\lambda_2$ are computed. The Eigen vector associated with the highest Eigen value (let say $\lambda_1$) is the main spreading direction of the seeds. The lines identified by the arrows in FIG. 3b show the Eigen vectors. The ratio $$\frac{\lambda_1}{\lambda_2}$$

indicates if the spreading direction is clearly following one of the two Eigen vectors. For example if $\lambda_1 = \lambda_2$, then the seeds spread equally along the two Eigen vectors and it is not likely to be an arm. One or more tests may be performed, such as if the ratio $$\frac{\lambda_1}{\lambda_2}$$

reaches a fixed threshold, if the number of seeds matches within the expected size for an arm, if the distribution along the eigen vector associated with the eigen value is $\lambda_2$ centered or zero, and/or if the direction of the main spreading direction is appropriate. For each group of seeds that satisfies the previous constraints or tests, a cut line is computed. The cut line that best separates the arm from the rest of the regions is identified. The evolution of the number of pixels, which have a distance from the main spreading line above a fixed threshold, is analyzed. In FIG. 3c, the cut lines are perpendicular to the main spreading Eigen vectors.

Pixels associated with a group of seeds succeeding in every constraint or test are removed. These pixels are associated with the detected arms. FIG. 3d shows the skeleton two-dimensional image with the arm information removed. Other algorithms or manual selection and removal may be used.

In one embodiment, the arm removal algorithm's parameters, such as the thresholds used, may be optimized using a genetic algorithm to select the best thresholds and parameters based on a hand-segmented set of data. User set, programmed, or other optimization may be used.

Additional or different preprocessing for clustering may be used For example, the image is rescaled. Scale information may be input, received, or determined, such as using DICOM scale information. As another example, noise may be removed or reduced in the image. Low pass filtering may be used. Alternatively or additionally, connected groups of pixels that fall under a fixed number of pixels may be removed.

In act 20, the preprocessed skeletal two-dimensional representation of a three-dimensional volume or other medical image is partitioned. The skeletal information is clustered into one or more different clusters. The clustering may identify only one region.

Any partitioning may be used, such as correlation with a representative image. In one embodiment for partitioning an arbitrary view, clustering is performed. The goal of the partitioning algorithm is to split the input 2D image into regions of interest (ROIs). The number of ROIs in the input 2D image is unknown. To partition into an unknown number of ROIs, any clustering may be used, such as density clustering. Any density-based connectivity clustering class or other class of density clustering algorithms may be used. A clustering algorithm partitions a data set into subsets (clusters) so that the data in each subset share some common traits. The similarity of two elements is measured by a distance function.

The goal of the clustering algorithm is to break down the input images into several parts. The parts can be for example the head, rib, hip, back, and legs. Considering the input image in horizontal lines, each line that belongs to a part has almost the same width and density (in pixels) than another line in the same part. The line width and density are used in the clustering algorithm. For example, the features used are:

1. width = $\max |x_a - x_b|$  $(a, b) \in$ line 2. density = $\frac{\text{count (line)}}{\text{width}}$ In one embodiment, a variant of density based clustering method called Locally Scaled Density Based Clustering (lsdbc) is used. Lsdbc does not require parameter intervention and offers flexibility given the unknown nature of the input. Other variants of the clustering algorithm may be used. For example, if parameter intervention is provided and if less accurate but faster speed is desired, other variants of density clustering may be used. Or, if the number of body regions in the input images is known, a K-mean clustering method may be used.

In lsdbc or other density clustering, the clustering is performed as a function of local density and/or local scaling. Other factors may be considered. Assuming a known orientation of the skeleton of the two-dimensional image, the partitioning may be limited to being along a height axis of the skeletal two-dimensional representation as a function of local density and local scaling. The image is partitioned along the height axis into horizontal regions of interest. Given arbitrary views, the partitioning may be vertical or at an angle.

In density-based clustering, the local density is analyzed. The distribution of the traits in an n-dimensional space is determined, and a cluster is propagated. To propagate a cluster, the centroid and surrounding shape are expanded until the density falls under a defined threshold. The threshold identifies when the traits are similar enough. Density-based clustering clusters points by connecting dense regions of space until the density falls below a threshold determined by the center of the cluster. The algorithm starts with an arbitrary point and computes its relations with its neighbors. The algorithm determines from the relations if this point and its neighbors form a cluster according to criteria and rules defined based on the distance function, point connectivity, and the number of points. The distance function defines the shape of the clusters and affects subsequent classification. If the point does not form a cluster, then next point in the list of seed points is selected and the procedure is repeated until all points are computed. The resulting clusters may be merged based on the distances between points in two clusters, or split if the number of points in a cluster is high based on constraints. The distance measurement may be a Euclidean distance or other distance function.

In the lsdbc embodiment, the preprocessed 2D view is partitioned along the width axis. The lsdbc variant of the density-based clustering uses local scaling. Local scaling makes use of the local statistics of the data when identifying clusters. A scale factor is applied to the distances around each point in the dataset proportional to the points distance to the point's local nearest neighbors. In doing so, the scale factors for clusters with different densities are found and thus the Lsdbc density clustering method can partition skeletal regions with different cluster densities better than some other density clustering methods.

lsdbc has two parameters: k, the order, or number of, nearest neighbors, and α, which decides when the drop of the density is necessary for a cluster change. Let d(p, q) be the distance between p and q. The neighborhood of p is defined as $N_\epsilon(p) = \{q \in \text{Points}/d(p, q) \leq \epsilon\}$ where Points is the set of points of the image and ϵ is the distance from the k-Nearest Neighbor. The density of a point p is given by density $$(p) = \frac{k}{\epsilon^n}$$

where n is the dimension of points (i.e., the number of dependent values contributing to each point in the cluster space). For a point p in a cluster, all points in the neighborhood of p (i.e., $N_\epsilon(p)$) defined above, having a density above $$\frac{\text{density}(p)}{2^\alpha},$$

belong to the same cluster. The cluster is expanded systematically, starting from the point having the highest density.

In one embodiment, the density clustering is tuned. The separate ROIs are defined by how the learning in act 32 is performed. The hand segmented truth sets may be established to optimize or tune the clustering of act 20. For example, the clustering clusters scan lines containing the pelvis to a different partition from the scan lines containing the legs regions because the algorithm learned to separate in such a way given the input hand ROIs and the features selected as input. Three features are extracted for each row of the image as input to density clustering: the number of non-zero pixels, the position of each row, and the maximum width of the non-zero region. Different features may be extracted. After clustering, the 2D skeletal image is partitioned along the width axis. lsdbc attributes a cluster identifier for each horizontal row of the image.

Figure 4:
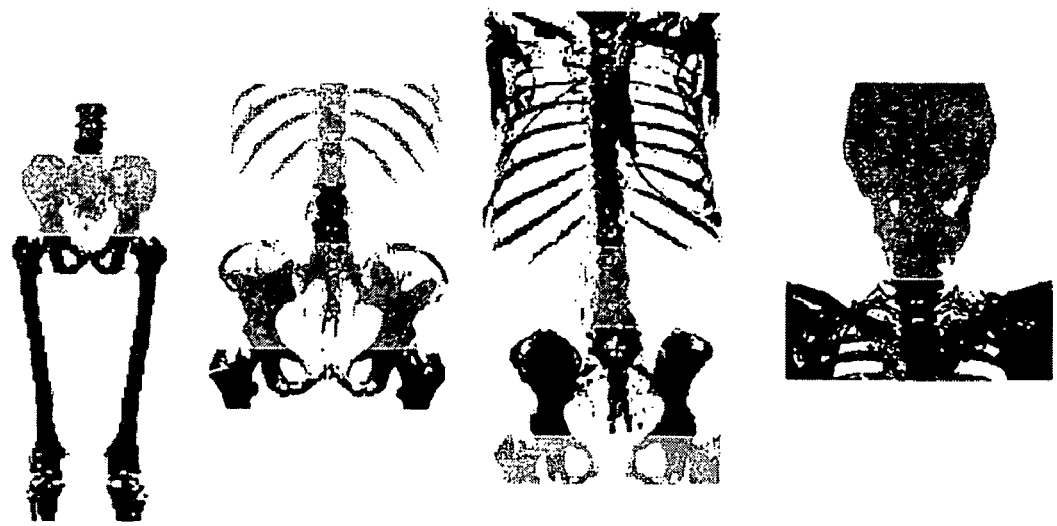
FIG. 4 shows example partitioned medical images.

FIG. 4 shows clustered 2D coronal views in example images. The horizontal lines and/or shading differences represent different clusters. The horizontal lines separating the clusters segment the ROIs. In one embodiment using lsdbc clustering, the algorithm may segment a rendered image in less than 0.4 second.

Acts 22 and 24 are performed to classify the regions identified by the partitioning of act 20. For example, each of the separate two, three, or four regions shown in the example images of FIG. 4 is classified. The classification labels the region of interest, such as labeling as a head, pelvis, torso, upper torso, lower torso, legs, neck, and/or other body part. A single region may be labeled.

The classification uses only information local to the region being classified. Information from a single region is used to classify that region. In alternative embodiments, information from other regions is used to classify a given region, such as classifying using a model considering both local and global features.

In act 22, features are extracted. Discriminative features are extracted from the clusters to recognize the body part represented by the cluster. For example, local features are extracted for each of the regions. Any feature may be extracted, such as a measure of pattern matching, an amount of correlation, size, shape, density, cluster parameter value, filter output, or other feature. For example, the image intensity and Gabor filtered image results of each ROI are used as features.

In one embodiment, local features are extracted by Gabor filtering the image and/or each region. Other directional or non-directional filtering may be used. Each ROI is convolved with one or more Gabor filters. The human skeleton is mainly composed of oriented lines. Gabor features and the image intensity may provide sufficient discrimination. The Gabor filters isolate or output information associated with the likely frequency and/or orientation for features indicating the body part. The optimal set of Gabor filters is precomputed offline on an independent training dataset or designed by a person.

A Gabor filter is a linear filter defined as the product g of a sinusoidal function s and a Gaussian shape $w_r$. The Gabor filter is characterized by a preferred orientation and a preferred spatial frequency. Gabor features are well suited for classification of skeletal regions since the skeleton is essentially composed of oriented straight lines with a specific frequency (rib cage, legs, neck . . . ).

$$g(x, y) = s(x,y) w_r(x,y)$$

$$s(x, y) = Im(e^{j(2\pi(u_0 x + v_0 y) + P)})$$

where $(u_0, v_0)$ and P define the spatial frequency and the phase of the sinusoidal respectively, $x \in E[0 \ldots dx]$ and $y \in [0 \ldots dy]$ where (dx,dy) is the size of the filter.

$$w_r(x, y) = K e^{-\pi(a^2(x-x_0)_r^2 + b^2(y-y_0)_r^2)}$$

where $(x_0, y_0)$ is location of the peak of the function, a and b are scaling parameters of the Gaussian, and the r subscript stands for a rotation operation, defining the rotation of the Gaussian envelop.

Figure 6:
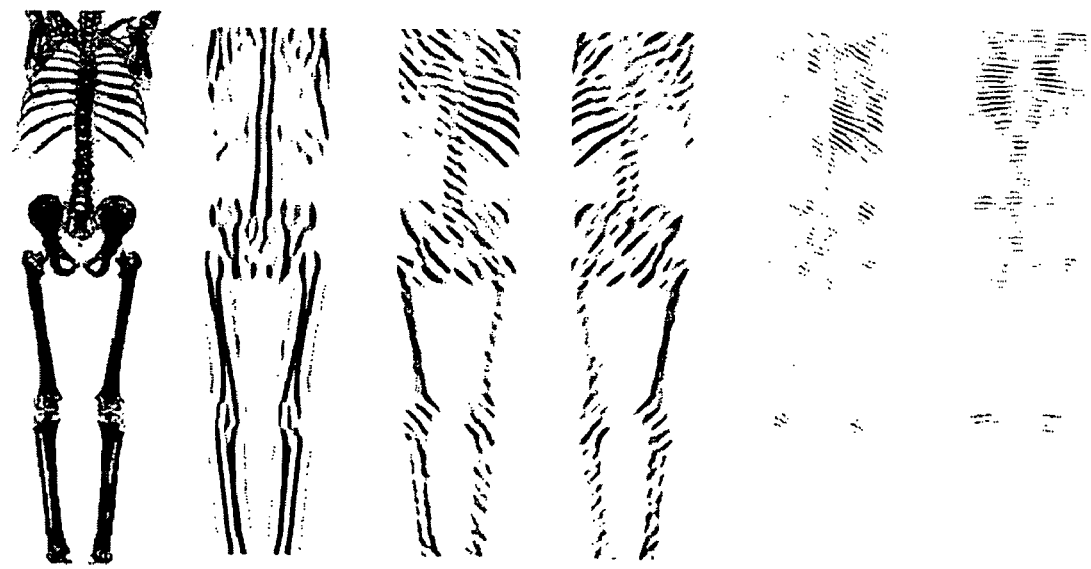
FIG. 6 shows a medical image after filtering by Gabor filter functions.
Figure 5:
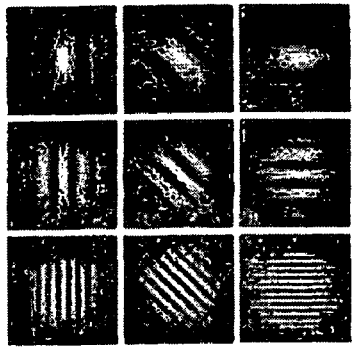
FIG. 5 is a visual representation of a plurality of example Gabor filter functions.

The Gabor filters are applied to the image regions. The input image is split along the width axis into multiple sub-images according to the clusters found by lsdbc or other clustering. FIG. 5 graphically represents an example set of nine Gabor filter functions. Different orientations and spatial frequencies are shown. FIG. 6 shows the output from Gabor filtering with five different Gabor filter functions applied to the image on the left. Some of the five Gabor filter functions are not shown in FIG. 5. The differences in angle of emphasis (see the three filtered images on the left showing vertical, and +/−45 degree angles from vertical) and spatial frequency (compare the three filtered images on the left with the two filtered images on the right) are shown in FIG. 6.

The output from the filtering for each region is used to extract one or more features. For each sub-image, a feature vector composed of the convolutions of the selected filters with the corresponding sub-image is created. To reduce information, the output of the filtering is sub-sampled. The resulting images are subsampled to a much lower dimension, such as 9×9 pixels or other resolution. The sub-sampled outputs are concatenated for each of the regions as the features.

In act 24, the features are input into a classification model, such as a machine-learnt algorithm. Each cluster or region is classified as a region of the body. The classification is a function of information local to the respective region. The features, such as the image and Gabor filter sub-sampled features, are used to recognize the ROI. In one embodiment for targeted regions of interest extracted from projected CT medical images, the classification model is a Support Vector Machine (SVM) machine-learning algorithm. Other models or classifiers may be used, such as Multi-Layered perception (MLP) or Boosted MLP with AdaBoost.M1. Any kernel may be used with the SVM. For example, a standard Radial Basis Function (RBF) kernel is provided. The input of the SVM is provided with the Gabor feature vector to compute the label of a cluster. The output label is a body part.

In acts 26 and 28, global coherence of the labels or classification output is checked. Discrepancies across the classifications of the different regions are resolved and/or highlighted. The classifier may use only local information (i.e. the current ROI) to make a decision. The coherence model has a global approach. The coherence model takes advantage of the sequence of labels found by the classifier and/or other information, such as the size and location of the ROI, to correct and/or indicate a possible error.

In act 26, the labels are preprocessed. The preprocessing simply prepares the labeled results into an array of observations as input to the conherence model in act 28. Other preprocessing may be provided.

Figure 7:
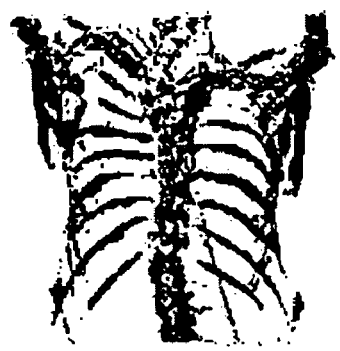
FIG. 7 illustrates coherence enhancement according to one embodiment.
Figure 7:
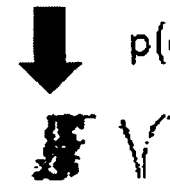
Figure 7:

In act 28, coherence of the classifying across the regions is ensured. A model of a sequence of body parts is applied to the output of the classifying. The output of the classifying may include the same label for different regions, different labels but in an incorrect sequence, other errors, or correct labeling of the body parts. For example in FIG. 7, the middle cluster is labeled as Neck. Without the context (i.e. other clusters), it is difficult to classify this cluster or middle region correctly. The middle region, based on local analysis, could be the neck but also the end of the back or lower spine. Given the sequence Ribs-Neck-Hips, there is an error. It is more likely that the label Neck is wrong. The coherence model is used to detect and correct inconsistent cases.

Any model may be used, such as a human programmed or a trained model. In one embodiment, a Hidden Markov Model (HMM) is applied to ensure the global coherence of the sequence of labels. A first or other order HMM may be used. The HMM model improves the classification by improving the probability that the labels of adjacent body regions meet a trained expectation. For example, head regions are rarely expected to be adjacent to leg regions, so the model notes the error or determines a different label for one of the head or leg regions. The HMM is a finite set of states, each of which is associated with a probability distribution called emission probability. Transitions among the states are governed by a set of probabilities called transition probabilities. In a particular state, an outcome or observation may be observed and given a probability according to the probability distribution. Only the outcome, not the state, is visible to an external observer.

A HMM is a triplet (πA, B) where π=(π$_i$) with π$_i$ is the initial state i probability. A=(a$_{ij}$) with a$_{ij}$ being the probability p(q$_{it}$q$_{jt-1}$) and B=(b$_{ij}$) the emission probability where b$_{ij}$ is the probability to see the observation i in state j. The HMM makes two assumptions. First is the markov assumption: p(q$_i$|q$_1$ . . . q$_{i-1}$)=p(q$_i$|q$_{i-1}$). The probability of a particular state is dependent only on the previous state. Second is the output independence assumption: p(b$_i$|q$_1$ . . . q$_T$, b$_1$ . . . b$_r$)=p(b$_i$|q$_i$) with T being the number of states. The probability of an output observation b depends only on the current state i and observation.

In one embodiment, each observation has three features: the label found by the classification algorithm, the size of the cluster (e.g., the number of rows), and the position of the cluster in the image (e.g., the center location of the cluster row position). The hidden variables are the real label of the cluster, which may or may not be the same as the labels found by the SVM classifier. From the list of clusters, the corresponding list of observations is built. The Viterbi, a dynamic programming algorithm known in the art, is applied to find the most likely sequence of states. This most likely sequence is the final and corrected sequence of labels. Other algorithms may be used.

In act 29, an output is generated. The output is the corrected labels and a confidence value (e.g. a probability) of each label being correct. In other embodiments, the output is one or more labeled regions of an image or dataset. For example, the data representing a volume associated with a subset of regions is used to render an image of the region. Where the rendering is for that specific type of region, the output provides the data to be rendered. The regions from the two-dimensional image may be labeled and displayed. The output is added into a field in the corresponding DICOM images or other data field. The output may be displayed.

In the development or training phase, acts 30-38 are additionally performed. Any of the development acts 30-38 may be performed manually. For example, a user programs an algorithm with the parameters, values, features, models, or other information used to perform acts 12-29. Alternatively, one or more of acts 30-38 are performed automatically or semi-automatically using machine learning or training. Examples of machine learning are provided below.

In act 30, the parameters for identifying arm regions are learned. A model to recognize the arms is precomputed using a hand-segmented training dataset. An expert indicates arm regions in a variety of training images. The images represent different likely and/or unlikely scans, renderings, arm positions, or other factors altering the view of the arms relative to the rest of the skeleton. The model is trained from the training images using a genetic algorithm. Other algorithms may be used. The result is a set of optimized parameters based on the training set used in the partitioning preprocessing act 18.

In act 32, clustering parameters are learned and optimized also as a function of a genetic algorithm. The distance function parameters used by the lsdbc clustering algorithm and the clustering parameters are optimized offline on a hand-segmented dataset using the genetic algorithm. The result is a set of optimized parameters based on the training set used in the partitioning act 20.

A metric is used to measure the distance between two rows of the image. For example, the metric has the form $$d(x, y) = \sum_{i=1}^{3} \alpha_i (x_i - y_i)^{2n}$$

with α$_i$ being the scaling factor of the i$^{th}$ feature. Other metrics may be used. The optimal parameters (α$_i$, n) of the distance function as well as the parameters of lsdbc (i.e. k and α) are precomputed during the learning phase. The genetic algorithm optimizes for the parameters based on a quality metric rating in comparison to hand segmented ideal results. The genetic algorithm uses segmented datasets. The datasets are composed of 10 representative hand-segmented scans, but a greater or less number of training datasets may be used.

The quality of the automatic segmentation is compared to the quality of the hand segmentation. Given a dataset, the test and reference datasets are checked line by line, with a fitness function f The genetic algorithm tries to maximize 1/f with:

$$f(d) = \sum_{i \in d} \left( \alpha clusterPenalty(i) + \beta \sum_{l \in line(i)} linePenalty(l) \right)$$

where d is the hand-segmented dataset, cluster Penalty assigns a penalty when the number of clusters found is different and line Penalty attributes a penalty when the ID assigned to a line by lsdbc is different from the one in the hand-segmented dataset. A strong penalty factor is used if the number of clusters in the test and reference segmentation differs. Other penalties and checks may be used. By minimizing f, the number of clusters and their location is more likely matched with the hand-segmented dataset.

Other algorithms than a genetic algorithm may be used. However, the genetic algorithm may handle the number of parameters to be optimized simultaneously and operate in a short amount of time. After several hours of computation, the genetic algorithm converges to the same solution. In this way, the parameters of the density function and the clustering parameters (i.e. the k and α values) are automatically determined.

In act 34, the features that best or sufficiently distinguish different parts of the body from the output of the clustering and other inputs to classification are determined. A plurality of possible features is provided. Each feature is tested for contribution to classification. The best or sufficient features are selected. For example, a filter bank of Gabor filters with various scales and rotations (e.g. horizontal, vertical, and diagonal rotations) is created. From this bank, a few of the filters are selected. A precomputed set of filters is selected during this learning or programming phase. For machine learning, the set may be selected from the filter bank using a greedy algorithm that selects the most discriminative filter each iteration until the recognition accuracy is not improved or does not improve a threshold amount. Combinations of features may be optimized.

In act 36, a classifier is trained as a function of features derived as a function of the optimized clustering parameters. The features are local features derived from the clusters. The classifier is trained using at least some features calculated from the regions output by clustering.

Any model may be used for classification. In one embodiment, a SVM model is used. To build a model for the regions of interests, parameters for the SVM classifier are trained offline on a hand-segmented and hand-labeled dataset during the learning phase. For example, each skeletal body region within the input images are hand segmented and labeled. A plurality of different segmented and labeled datasets is provided. These datasets are used to train the SVM model. The output SVM model parameters are used during runtime to classify unknown data inputs.

SVM is a classification system rooted in the statistical learning theory and delivers high performance in real-world applications. SVM determines the optimal hyperplane that maximizes the margin. The margin is the distance between the hyperplane and nearest sample from the hyperplane. Assuming the training set (sample and its label) is denoted as $S=((.x_0.y_0) \ldots (x_n y_n))$. The decision function is defined by $f(x)=\Sigma\alpha_i y_i x_i \cdot x$
where $\alpha_i$ is the solution of a quadratic programming problem. The training sample with non-zero $\alpha_i$ is called a support vector. In the linearly non-separable case, the transform $\phi(x)$ is used. The training samples are mapped into high dimensional space by $\phi(x)$. By maximizing the margin in high dimensional space, non-linear classification may be done. If the inner product $\phi(x)\cdot\phi(y)$ in high dimensional space is computed by the kernel K (x, y), then training and classification may be done without mapping into high dimensional space. The decision function using the kernel is defined by:

$$f(x) = \sum_{i=0}^{n} \alpha_i y_i K(x_i, x)$$

In act 38, a model is trained for establishing coherence of outputs of the classifier. Any model may be used. In one embodiment, a HMM model is used. Parameters used for the HMM model are trained offline on a hand-labeled and hand-segmented dataset during the learning phase.

The optimal parameters of HMM are computed given the known pair (observation, state) in the training dataset. $\pi$ and A are computed by counting the labels. The density distribution $b_i$ is modeled by a Gaussian Mixture Model (GMM). A GMM is a weighted sum of Gaussian distributions:

$$p(x | \theta) = \sum_{i=1}^{M} \alpha_i p_i(x | \theta_i)$$

With x an observation, $\alpha_i$, the weight of the Gaussian $p_i$ is:

$$p_i\left(x | \mu_i, \sum_i\right) = \frac{1}{(2\pi)^{d/2}|\Sigma_i|^{1/2}} e^{-\frac{1}{2}(x-\mu_i)^T \Sigma_i^{-1}(x-\mu_i)}$$

where $\mu_i$ is the mean observation of the $i^{th}$ Gaussian, and $\Sigma_i$ is the covariance matrix of the $i^{th}$ Gaussian. Directly computing $\Sigma_i^{-1}$ may lead to numerical instabilities. The covariance matrix is approximated by its diagonal, fixing the numerical instabilities.

For each state, a GMM composed of a fixed number of Gaussians is trained by an Expectation Maximization (EM) algorithm over the observations in state i.

The method of FIG. 2 has been tested on 127 CT scans (representing 359 different clusters). These scans come all from different people. Each scan has a number of clusters ranging from one to five, a significant part of the scans are not complete clusters (e.g., missing a part of the head, rib cage, or legs) and are noisy (e.g., bad image reconstruction, medical tools or wire plugs). The ROIs recognized by the method are head, neck, rib cage, pelvis, and legs. The testing database is composed of 308 clusters, representing 110 different ROIs, and 51 clusters for the training dataset, representing 17 scans. The testing machine is a single core Pentium 2.79 GHz processor and 1 GB of RAM.

The initial Gabor filter bank is composed of 150 filters with various kernel sizes, orientations and spatial frequencies. An algorithm selects offline the most discriminative filters on an independent training dataset. Two filters (vertical and diagonal) were selected and used for all the targeted regions of interests (i.e., head, neck, rib cage, pelvis, and legs). No improvement of the accuracy was observed with more features. The filtered clusters as well as the original cluster sub-image were then down sampled to a 9*9 size. Thus, 9×9×3=243 features for each cluster were extracted and given to the classification algorithm. The SVM used a RBF kernel with the optimal parameters=0.006 and a cost margin of 100.

The quality of the partitioned testing dataset was visually assessed and no error is noticed. Often a part (e.g., rib cage, or head) is partitioned in several clusters, but the SVM and coherence model are robust enough to label the parts correctly.

Table 1 shows the mean recognition time per scan over the testing dataset for the different steps.

TABLE 1

Mean computation time per scan (recognition time).

| Operation | Mean time(s) |
| --- | --- |
| Clustering | 0.36 |
| Filtering | 1.01 |
| Labeling | 0.01 |
| Coherence | 0.08 |
| Total | 1.45 |

A significant part of the time is spent in the filtering. Efficiency may be further optimized. Table 2 shows the accuracy across the label types.

TABLE 2

Accuracy comparison with optimal parameters

| Cluster type | Accuracy |
| --- | --- |
| Head | 90.0% |
| Neck | 96.3% |
| Rib cage | 93.6% |
| Pelvis | 93.5% |
| Legs | 99.8% |
| Overall | 95.8% |

Table 3 further illustrates the contribution by different acts in the method of FIG. 2. For example, without the Gabor feature and no coherence model applied, the accuracy is only at 87.5%. With the Gabor feature and the coherence, accuracy of 95.8% is provided.

TABLE 3

Accuracy comparison per stage

| Steps used | Accuracy |
| --- | --- |
| no Gabor, no coherence | 87.5% |
| Gabor, no coherence | 93.8% |
| Gabor, coherence | 95.8% |

Figure 8:
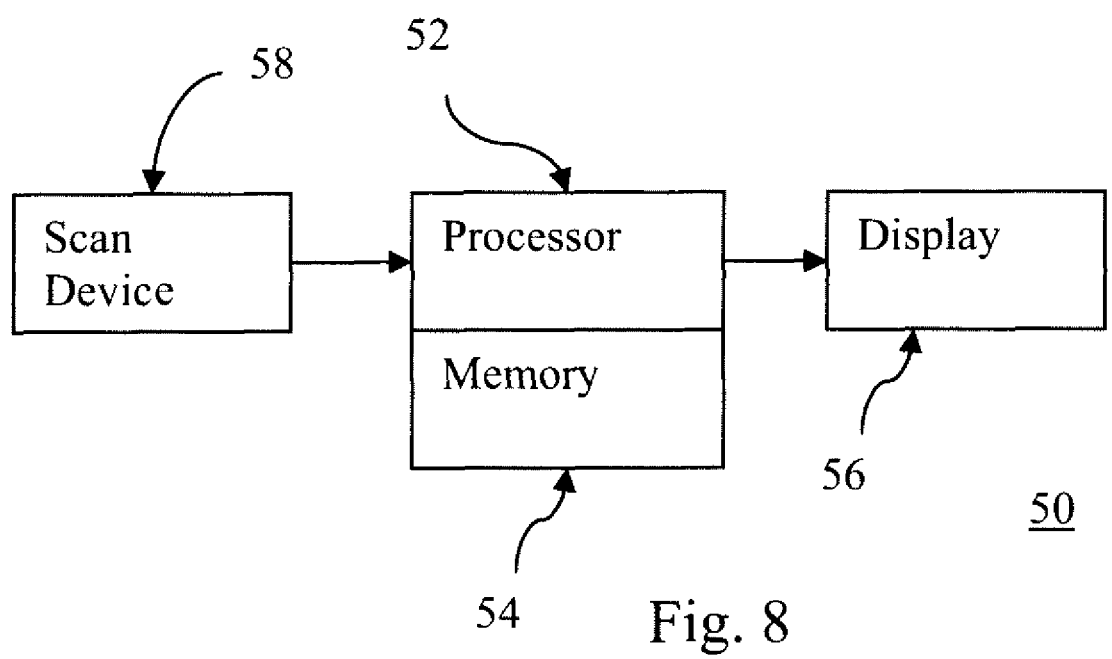
FIG. 8 is a block diagram of one embodiment of a system for partitioning body regions in a medical image of an arbitrary view of a body.

FIG. 8 shows a system 50 for partitioning body regions in a medical image of an arbitrary view of a body. The system 50 includes a processor 52, a memory 54, a display 56, and a scan device 58. Additional, different or fewer components may be provided. In one embodiment, the system 50 is a medical diagnostic imaging system, such as a computed tomography medical imaging system. In other embodiments, the system 50 is a computer, workstation or server. For example, a local or remote workstation receives images for computer-assisted diagnosis. In another embodiment, the system 50 includes an imaging system connected with a workstation. The system 50 identifies portions of the image. The system 50 may identify portions of a medical image associated with magnetic resonance, computed tomography, nuclear, positron emission, x-ray, mammography or angiography.

The scan device 58 is a medical imaging device. The scan device 58 is operable to acquire data representing a three-dimensional volume of a patient or a two-dimensional region. Any scan device 58 may be used, such as a computed tomography system. The processor 52, memory 54, and/or display 56 are part of the scan device 58 or are separate devices, such as a remote workstation.

The processor 52 is one or more general processors, digital signal processors, application specific integrated circuits, field programmable gate arrays, servers, networks, digital circuits, analog circuits, combinations thereof, or other now known or later developed device for processing medical image data. The processor 12 implements a software program, such as code generated manually or programmed or a trained classification or model system. The software locates and classifies regions of the image data corresponding to different body parts. Alternatively, hardware or firmware implements the identification.

The processor 52 is operable to render a two-dimensional representation of the three-dimensional volume from the data. Alternatively, the scan device 58 renders the representation. In other embodiments, a two-dimensional image is used without rendering or volume scanning.

The processor 52 is operable to locate different regions of an image. For example, the processor 52 clusters the two-dimensional representation into one or more, such as at least two, clusters. Any type of location algorithm may be implemented. For example, density clustering is used.

The processor 52 is operable to classify as a function of features local to the clusters. Features for each cluster are used to classify the region. Where two or more regions are provided, the processor 52 classifies each region. Correctly classified, each region has a different label, such as ribs and pelvis.

The processor 52 is operable to ensure coherence of the classifying across the different regions. The output labels of the classification of each region are checked against a model of expected sequence of labels. If an inaccuracy is located, the labels may be corrected, such as correcting based on a probability.

The memory 54 is a computer readable storage media. Computer readable storage media include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 54 stores the image data for or during processing by the processor 52. The image data is the data representing the volume and/or the two-dimensional image data. Other data, such as features, parameter values, variable values, filtered images, processed images, or extracted information may be stored in the memory 54. The data is input to the processor 52 or the memory 54.

The display 56 is a monitor, CRT, LCD, plasma, projector, printer, or other now known or later developed display. The display 56 responds to image data to form a display. Image data include RGB, gray scale, YUV, intensity, detected, or other now known or later developed data values for imaging on the display 56. The image data may be in a Cartesian coordinate, polar coordinate or other format. The image data represents different types of information, such as signal information and other information (e.g., textual and/or background).

The display 56 is operable to output image information as a function of the classification of the clusters. The labels, segmented regions, or combinations thereof are output on the display 56 for viewing by a user. For example, the processor 52 causes the display 56 to output an image of a region segmented from the other regions of an image and not one or more of the other regions. The region selected for output is selected based on the classification. The image of the region may be extracted from the input region, re-rendered from the input data, or otherwise processed prior to display.

In one embodiment, the memory 14 is a computer readable storage media having stored therein instructions executable by the programmed processor 12. The automatic or semiautomatic operations discussed herein are implemented, at least in part, by the instructions. The instructions cause the processor 12 to implement any, all or some of the functions or acts described herein. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multi-tasking, parallel processing and the like.

In one embodiment, the instructions are stored on a removable media drive for partitioning body regions in a medical image of an arbitrary view of a body or for learning to partition body regions in a medical image of an arbitrary view of a body. The scan device 58 or a workstation uploads the instructions. In another embodiment, the instructions are stored in a remote location for transfer through a computer network or over telephone communications to the imaging system or workstation. In yet other embodiments, the instructions are stored within the imaging system on a hard drive, random access memory, cache memory, buffer, removable media or other device.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for recognizing body regions in a medical image of an arbitrary view of a body, the method comprising:
    projecting the three-dimensional volume to a two-dimensional view of the high density tissues and objects, the two-dimensional view comprising a skeletal two-dimensional representation;
    partitioning the skeletal two-dimensional representation of the three-dimensional volume, the partitioning being a function of density clustering;
    classifying one or more regions, the one or more regions being a function of the partitioning; and
    ensuring coherence of the classifying across the at least two regions.

2. The method of claim 1 wherein partitioning comprises applying clustering to the skeletal two-dimensional representation and an additional two-dimensional representation, the skeletal and additional two-dimensional representations rendered from different views of the three-dimensional volume.

3. The method of claim 1 further comprising binarizing a two-dimensional rendering, the binarized two-dimensional rendering comprising the skeletal two-dimensional representation, and wherein partitioning comprises removing information from the skeletal two-dimensional representation associated with arms.

4. The method of claim 1 wherein partitioning as a function of density clustering comprises partitioning along a height axis of the skeletal two-dimensional representation as a function of local density and local scaling.

5. The method of claim 1 wherein classifying comprises extracting local features for each of the one or more regions.

6. The method of claim 5 wherein extracting comprises Gabor filtering each of the one or more regions of the skeletal two-dimensional representation, sub-sampling an output of the filtering, and concatenating the sub-sampled output for each of the one or more regions as the features.

7. The method of claim 5 wherein classifying comprises inputting the features into a machine learnt algorithm.

8. The method of claim 1 wherein classifying comprises classifying only with information local to each of the one or more regions, and wherein ensuring coherence comprises applying a model of a sequence of body parts to an output classifying of the one or more regions, the one or more regions classified as different ones of the body parts.

9. The method of claim 8 wherein applying the model comprises applying a Hidden Markov Model.

\* \* \* \* \*